United States Patent [19]

Dunkle et al.

[11] Patent Number: 4,687,795

[45] Date of Patent: Aug. 18, 1987

[54] POLYESTER MOLDING COMPOSITIONS

[75] Inventors: Steven R. Dunkle, Flanders, N.J.; John C. Haylock, Dennysville, Me.

[73] Assignee: Allied Corporation, Morris Township, Morris County, N.J.

[21] Appl. No.: 685,813

[22] Filed: Dec. 24, 1984

[51] Int. Cl.[4] ............................................. C08K 5/09
[52] U.S. Cl. .................................... 523/436; 523/455; 524/605
[58] Field of Search ............... 524/396, 605; 523/436, 523/455

[56] References Cited

U.S. PATENT DOCUMENTS

| | | | |
|---|---|---|---|
| 3,367,926 | 2/1968 | Voeks | 260/93.5 |
| 3,368,995 | 2/1968 | Furukawa et al. | 524/396 |
| 3,595,818 | 7/1971 | Weissermel et al. | 260/22 |
| 4,327,007 | 4/1982 | Vanderkooi et al. | 524/605 |
| 4,344,874 | 8/1982 | Akagi et al. | 524/396 |
| 4,352,904 | 10/1982 | Deyrup | 524/292 |
| 4,548,778 | 10/1985 | Fujii | 264/180 |

FOREIGN PATENT DOCUMENTS 1139528  1/1969  United Kingdom ............... 524/396

*Primary Examiner*—Lewis T. Jacobs
*Attorney, Agent, or Firm*—Richard A. Negin; Patrick L. Henry

[57] ABSTRACT

Polyester compositions having present a small amount of a salt of salicyclic acid and a cation of a metal from Group IA of the periodic Table of Elements, for example sodium salicylate, have been found to have good crystalization and other properties.

13 Claims, No Drawings

POLYESTER MOLDING COMPOSITIONS

BACKGROUND OF THE INVENTION

1. Field of the Invention

This invention relates to linear, saturated polyester compositions containing salts of salicylic acid as nucleating agents.

2. Description of the Prior Art

It is known to use nucleating agents in crystallizable polymers such as linear saturated polyesters of aromatic dicarboxylic acids. For example, it is known to use salts of certain hydrocarbon and polymeric carboxylic acids as nucleating agents for linear saturated polyester molding compositions.

A molding composition based on linear saturated polyester such as poly(ethylene terephthalate) should result in a molded product having good physical properties including flexural strength, modulus, tensile strength and impact properties. Further, the molding composition should have good molding properties including a fast molding cycle, a melt flow index for sufficient flow into the mold, good mold release properties and good finished appearance.

From a practical point of view, it is desirable that satisfactory properties, as outlined above, be attained using water heated molds. Water heated molds are heated to temperatures between 76.7° C. (170° F.) to about 100° C. (212° F.). In order to use water heated molds, it is desirable for crystallization to begin at as high a temperature as possible upon the cooling of the polyester melt which has been fed into the mold, and for the crystallizaion to continue during cooling to as low a temperature as possible. $T_{cc}$ is the temperature at which crystal formation begins. $T_{ch}$ is the temperature at which crystallization of the polyester melt ceases to occur upon cooling. It has been found that molded article appearance and mold release properties can be related to the $T_{ch}$ value. $T_{ch}$ is determined by measuring the temperature at which crystals appear upon heating a polyester composition in amorphous form. $T_{cc}$ and $T_{ch}$ can be measured using a Differential Scanning Calorimeter.

SUMMARY OF THE INVENTION

This invention relates to a composition comprising a linear, saturated polyester, such as poly(ethylene terephthalate), containing a crystallization enhancing amount from about 0.05 percent to about 2.0 percent, preferably about 0.1 percent to about 1.5 percent, more preferably about 0.2 percent to 1.25 percent, and most preferably about 0.4 percent to about 1.0 percent of a salt of salicylic acid and a cation of a metal from Group IA of the Periodic Table of Elements based on the weight of the polyester. Preferably, the composition of the present invention contains from about 2 percent to about 10 percent of a plasticizer, and from about 2 percent to about 30 percent of an impact modifier, both based on the weight of poly(ethylene terephthalate). The composition can comprise a filler in an amount up to about 150 percent, based on the weight of the poly(ethylene terephthalate).

The present invention is a polyester composition, such as a poly(ethylene terephthalate) composition, which can be molded in water-heated molds at relatively low temperatures and a method of making a crystalline polyester composition. To accomplish this, the crystallization must begin at as high a temperature ($T_{cc}$) as possible. The composition of the present invention uses a salt of salicylic acid and a cation of a metal from Group IA of the Periodic Table of Elements. The salt acts as a nucleating agent which can increase the temperature at which crystallization begins.

Objects, features and advantages of the present invention will become apparent by reference to the following specification:

DESCRIPTION OF THE PREFERRED EMBODIMENTS

This invention relates to a composition comprising a mixture of a linear saturated polyester, preferably poly(ethylene terephthalate), and from about 0.05 percent to about 2.0 percent, preferably from about 0.1 percent to about 1.5 percent, more preferably from about 0.2 percent to about 1.25 percent, and most preferably from about 0.4 percent to about 1.0 percent, based on weight of the poly(ethylene terephthalate) of a salt of salicylic acid and a cation of a metal from Group IA of the Periodic Table of Elements (hereinafter called "salicylate salt"). In the most preferred embodiment, the composition contains a plasticizer. Preferably, the composition contains a filler such as fiberglass and an impact modifier. There can be up to about 150%, and preferably about 30% to about 120% filler based on the weight of the poly(ethylene terephthalate). The preferred filler is fiberglass in the range of from about 30% to about 90% by weight based on poly(ethylene terephthalate).

The composition of the present invention includes linear, saturated polyesters of aromatic dicarboxylic acids. The preferred linear saturated polyesters include poly(ethylene terephthalate), poly(butylene terephthalate), and poly(1,4-cyclohexane dimethylene terephthalate), with poly(ethylene terephthalate) being most preferred due to the low molding temperatures attainable using it. The poly(ethylene terephthalate) for use with the present invention desirably has an intrinsic viscosity range between about 0.4 and about 1.2, preferably between about 0.4 and about 1.0, and most preferably between about 0.6 and about 0.8. Intrinsic viscosity is obtained by extrapolation of viscosity values of solutions of poly(ethylene terephthalate) in a 60 to 40 weight/volume ratio of phenol and tetrachloroethane to zero concentration. The measurements are normalized to 25° C. The poly(ethylene terephthalate) melts between about 250° C. and 275° C. The poly(ethylene terephthalate) can contain minor amounts, up to about 10%, of other comonomers such as 1,4-cyclohexyldimethyldiol, butyldiol, neopentyldiol, diethylene glycol, or glutaric acid.

Salicylic acid is neutralized with a cation of a metal from Group IA of the Periodic Table of Elements. Preferably, the cation is sodium or potassium. The most preferred cation is sodium. The neutralization can occur between any appropriate cation containing material which causes salicylic acid to be neutralized. The cation containing materials are salts of weak acids, such as carbonates, bicarbonates, hydroxides, alkyloxides, and acetates. Preferred sodium containing materials are carbonates, bicarbonates and hydroxides, with sodium hydroxide being most preferred. The salicylic acid can be neutralized to a mono- or to a di-sodium salt of the following structure:

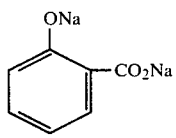

The salicylic acid can be neutralized to 100 percent or to essentially 100 percent of either the mono- or the di-sodium salt, or to a lesser percentage, as desired, so long as the resulting salicylate salt product effectively enhances crystallization.

There may be substituents at one or more of the available positions in the aromatic portion of the salicylic acid molecule so long as such substituents do not substantially interfere with the nucleating action of the salicylate salts and the properties of the compositions of the invention for example, such substituents as methyl or ethyl or lower alkoxy such as methoxy; compositions containing such salicylate salts are intended to be within the scope of this invention.

In the polyester composition there is from about 0.05 percent to about 2.0 percent, preferably from about 0.1 percent to about 1.5 percent, more preferably from about 0.2 percent to about 1.25 percent, and most preferably from about 0.4 percent to about 1.0 percent of the salicylate salt, based on the weight of the polyester, preferably poly(ethylene terephthalate). Desirably, there will be sufficient salicylate salt in the composition for crystallization to occur at a high enough temperature upon cooling the melt, to be able to mold the composition in water heated molds at temperatures from about 76° C. to about 100° C. This allows crystal formation in the polyester composition before the temperature decreases to that point at which crystallization otherwise is expected to occur.

The temperature at which crystal formation begins is $T_{cc}$. $T_{cc}$ is measured by placing a sample of the polyester composition in the Differential Scanning Calorimeter. The sample is made by molding an amount of between .5 and 10 milligrams of the polyester composition in the form of a film, which is vacuum dried. The sample after being placed in the Differential Scanning Calorimeter is heated to 280° C. and held at that temperature for 2 minutes. The sample is cooled at a rate of 10° per minute. At $T_{cc}$, crystallization begins and a sharp peak appears in the cooling branch of the curve caused by the heat of crystallization.

The $T_{cc}$ for pure poly(ethylene terephthalate) having an intrinsic viscosity of 0.56 is approximately 190° C. It is desirable for crystallization from the melt to begin at as high a temperature as possible without adversely affecting the properties of the molded composition. Preferably, there is sufficient salicylate salt present for the composition to have a $T_{cc}$ of at least 205° C.

$T_{ch}$ is measured using a similarly prepared polyester composition sample, except that the sample is melted and then quenched to assure that the sample is substantially amorphous. The sample is heated at a rate of 10° C. per minute and a peak appears in the curve when crystallization takes place. The $T_{ch}$ is the temperature at which crystallization begins.

Any suitable filler can be used in the composition of the present invention. The fillers may optionally be treated with various coupling agents or adhesion promoters as is known to those skilled in the art. Such fillers may be selected from a wide variety of minerals, metals, metal oxides, siliceous materials, metal salts, and materials thereof. Examples of fillers include glass fibers, alumina, feldspar, asbestos, talc, calcium carbonates, clay, carbon black, quartz, novaculite and other forms of silica, kaolinite, bentonite, garnet, mica, saponite, beidellite, etc. The foregoing recited fillers are illustrative only and are not meant to limit the scope of the fillers that can be utilized in this invention. The filler content can be up to about 150 percent, and preferably, about 30 percent to about 120 percent, by weight of the poly(ethylene terephthalate). The most preferred filler is glass fibers.

It is preferred to use a plasticizer in the composition of the present invention. The plasticizer facilitates crystallization of amorphous regions of the poly(ethylene terephthalate) to continue at temperatures lower than the lowest temperature crystallization would otherwise occur. This is particularly important in low temperature molding where the mold temperature is below the temperature at which crystallization is expected to stop. This temperature for pure poly(ethylene terephthalate) is about 125° C. (257° F.).

The plasticizers which can be used in the composition of the present invention include those types known in the art to be useful in linear saturated polyester molding compositions, preferably poly(ethylene terephthalate). A nonlimiting group of plasticizers which can be used is described in U.S. Pat. No. 4,352,904 (col.2,1.10f.), which are organic esters. The organic esters can be the product of an aromatic carboxylic acid of 7–11 carbon atoms containing at least one carboxyl group per aromatic nucleus, and an alcohol selected from those of the formula $(HOCH_2)_x R^1$ wherein x is 1, 2 or 3 and $R^1$ is a hydrocarbon radical of 2–15 carbon atoms (preferably 2–10 carbon atoms) or those of the formula $HO-(R''O)_y R$ wherein y is a cardinal number between 1 and 15, and preferably between 1 and 8, $R''$ is a hydrocarbon radical of 2–15 carbon atoms, preferably 2–8 carbon atoms, and R is —H or a hydrocarbon radical of 2–20 carbon atoms, preferably 2–12 carbon atoms. The plasticizer disclosed can also be the product of an aliphatic carboxylic acid of 1 to 20 carbon atoms containing 1–3 carboxyl groups, and an alcohol of the formula $HO(R''-O)_y R$, wherein $R''$, R and y are defined above. Further the plasticizers disclosed there include the following organic ketones of the formula

organic sulfones of the formula RSOOR; organic sulfoxides of the formula $R_2SO$; organic nitriles of the formula RCN; and organic amides of the formula

wherein R is a hydrocarbon radical having 1–25 carbons, and $R^1$ is a hydrogen or hydrocarbon radical having 1–25 carbon atoms. A preferred aliphatic plasticizer is dioctyl adipate, and a preferred aromatic plasticizer is neopentyl glycol dibenzoate. Other aromatic plasticizers which can be used include triethylene glycol dibenzoate, glyceryl tribenzoate, trimethylolethane tribenzoate, and pentaerythritol tetrabenzoate. Other preferred plasticizers are polyethylene oxide plasticizers and toluene sulfonamide type plasticizers such as Santicizer 8, 9 and 2097, sold by Monsanto Company.

In the present invention, up to about 15 percent plasticizer by weight of plasticizer can be used. Preferably, there is used between about 2 percent and about 10 percent, and most preferably, between about 2 percent to about 6 percent of plasticizer, based on the weight of the poly(ethylene terephthalate).

Preferably, copolymers of ethylene and carboxylic acids or their alkyl esters or salts can be selected as impact modifiers. Included among those modifiers are the following copolymers: ethylene-acrylic acid, ethylene-methacrylic acid, ethylene acrylate ester, ethylene-methacrylate ester and ethylene-vinyl acetate. Also, core-shell polymers can also be used, such as are described within the disclosure of U.S. Pat. No. 4,096,202, issued to Farnham et al. A preferred core-shell polymer has a core made by polymerization of a monomer mixture comprising an alkyl acrylate such as butyl acrylate and a shell of rigid thermoplastic nature which can be made by polymerization of a monomer mixture comprising methyl methacrylate. There can be used up to about 10 percent, and preferably from about 2 percent and about 6 percent of the impact modifier, based on the weight of the poly(ethylene terephthalate).

The composition can contain a polyepoxide. The epoxy resins which can be used include a polyepoxide formed from bisphenol-A and glycidyl ester, or poly epoxides obtained by reacting orthocresol, novolac and epichlorohydrin. Useful polyepoxides are epoxy cresol novolac resins produced by Ciba-Geigy Corporation, and include ECN 1235, 1273 and 1299. Preferred polyepoxides include a polyepoxide formed from bisphenol-A and glycidyl ester. Preferably, there is used up to about 3 percent, and more preferably about 0.1 percent to about 2.0 percent of polyepoxide based on the weight of the poly(ethylene terephthalate). The polyepoxides act as chain extenders and help to compensate for poly(ethylene terephthalate) chains which have been broken by hydrolysis.

In addition to the components discussed above, the compositions of the present invention can contain additives commonly employed with polyester resins, such as colorants, mold release agents, antioxidants, ultraviolet light stabilizers and the like.

A preferred filled composition comprises poly(ethylene terephthalate), from about 40 percent to about 60 percent glass fibers, and from about 0.5 percent to about 1.0 percent sodium salicylate. The composition can contain from about 3 percent to about 6 percent of a plasticizer such as an alkyl sulfonamide, from about 2 percent to about 4 percent of an ethylene-acrylic acid copolymer, and from about 0.5 to about 1.25 percent polyexpoxide. The percentages are based on the weight of poly(ethylene terephthalate).

The compositions of this invention are prepared by blending the components together by any convenient and appropriate means. For example, the poly(ethylene terephthalate) is mixed dry in any suitable blender or tumbler with the components and the mixture is melt extruded. The extrudate is chopped and mixed with reinforcing agent and then this mixture is again melt extruded. More conveniently, all the components are mixed dry in any suitable blender or tumbler and the mixture is then melt extruded.

The above described method of forming a crystalline polyester composition is particularly useful in providing a composition suitable for molding. A preferred molding method is injection molding. Here the composition can be melt blended in an extruder and injected into a mold. The temperature conditions of the melt blending are discussed above. The mold can be water cooled to as low as 76.7° C. up to 100° C. A warmer mold temperature allows crystallization to continue for a longer period of time but also entails a longer molding cycle.

The following example is set forth to illustrate the nature of the invention and the manner of carrying it out. However, the invention should not be considered as being limited to the details thereof.

EXAMPLE

A melt is formed using 500 g. of poly(ethylene terephthalate) having an intrinsic viscosity of 0.68–0.75 and 2.6 g. of sodium salicylate (0.52 percent based on the weight of poly(ethylene terephthalate)). The mixture is melt blended to form a uniform blend using a 1-inch single screw extruder and a blending temperature of about 280° C. The extruder has a barrel length of 24 inches. The extruded strand is chopped into pellets. The pelletized composition is analyzed for its $T_{cc}$ and $T_{ch}$ temperatures by the methods described above. $T_{cc}$ and $T_{ch}$ temperatures are likewise determined for the poly(ethylene terephthalate) used to make the composition. The resulting data are set forth in the following Table:

| Composition | % Na Salicylate | PET IV | $T_{cc}$°C. | $T_{ch}$°C. |
| --- | --- | --- | --- | --- |
| 1 | 0.52 | 0.52 | 229.7 | 117.3 |
| Control Compos. | 0 | 0.66 | 195.0 | 138.6 |

The Table shows that the Example 1 composition of the invention having 0.52 percent sodium salicylate has a desired higher $T_{cc}$ value and a lower $T_{ch}$ value.

The above run is repeated using 0.3, 0.4, 0.6 and 0.7 percent amounts, respectively, of sodium salicylate, based on the weight of poly(ethylene terephthalate).

While exemplary embodiments of the invention have been described, the true scope of the invention is to be determined from the following claims.

What is claimed is:

1. A composition comprising poly(ethylene terephthalate); a crystallization enhacing amount from about 0.5 to about 2.0 percent, based on the weight of the poly(ethylene terephthalate), of a sodium salt of salicylic acid;
   from 30 to 150 percent filler based on the weight poly(ethylene terephthalate); and
   from 2 to 15 percent plasticizer based on the weight of poly(ethylene terephthalate).

2. The composition as recited in claim 1, wherein there is from about 0.1 percent to about 1.5 percent of said salt, based on the weight of the polyester.

3. The composition as recited in claim 1 wherein there is from 0.2 percent to about 1.25 percent of said salt, based on the weight of the polyester.

4. The composition as recited in claim 3, wherein there is from about 0.4 to about 1.0 percent of said salt, based on the weight of the polyester.

5. The composition as recited in claim 1, wherein there is sufficient amount of said salt for the composition to have a $T_{cc}$ of at least about 205° C.

6. The composition as recited in claim 1 or 4, wherein the filler is glass fiber and is present in the amount from 30 percent to 90 percent, based on the poly(ethylene terephthalate).

7. The composition as recited in claim 1, wherein the plasticizer is selected from the group consisting of dioctyl adipate, neopentyl glycol dibenzoate, triethylene glycol dibenzoate, trimethylolethane tribenzoate, pentaerythritol tetrabenzoate, alkyl sulfonamides and polyethylene oxides.

8. The composition as recited in claim 1, comprising up to 10 percent of an impact modifier, based on the weight of the poly(ethylene terephthalate).

9. The composition as recited in claim 8, wherein there is from about 2 percent to about 6 percent of an impact modifier selected from the group consisting of ethylene-acrylic acid copolymers or ethylene-methacrylic acid copolymers and alkyl esters and salt thereof, ethylene-vinyl acetate copolymers, ethylene-propylene rubbers, and core-shell polymers.

10. The composition in claim 1, further comprising up to 3 percent of a polyepoxide, based on the weight of poly(ethylene terephthalate).

11. A composition comprising poly(ethylene terephthalate); from about 0.2 percent to about 0.8 percent of a sodium salt of salicylic acid based on the weight of the poly(ethylene terephthalate); from about 2 percent to about 6 percent of a plasticizer; from about 0.1 percent to about 0.5 percent of polyepoxide and 30 to 90 percent filler.

12. The composition as recited in claim 11 wherein the filler is fiberglass, and the said composition further comprises from about 2 percent to about 6 percent of an impract modifier selected from the group consisting of ethylene-acrylic acid copolymer or ethylene-methacrylic acid copolymer and salts and alkyl esters thereof, ethylene-vinyl acetate copolymers, ethylene-propylene rubbers, and core-shell copolymers, based on the weight of the poly(ethylene terephthalate).

13. An article having a smooth glossy surface molded from the composition of claim 4, 5, 6, 8, 9, or 12.

* * * * *